United States Patent

[11] 3,543,782

| [72] | Inventor | Peter Bauer |
| | | Germantown, Maryland |
| [21] | Appl. No. | 826,558 |
| [22] | Filed | May 21, 1969 |
| [45] | Patented | Dec. 1, 1970 |
| [73] | Assignee | United States of America |
| | | as represented by the Secretary of the Navy. |

[54] UNIAXIAL ACCELEROMETER CONTROLLED FLUIDIC AMPLIFIER
4 Claims, 2 Drawing Figs.

[52] U.S. Cl. ......... 137/81.5; 73/515
[51] Int. Cl. ......... F15c 3/00; G01p 15/02
[50] Field of Search ......... 137/81.5; 73/514, 515, 517

[56] References Cited
UNITED STATES PATENTS

| 3,019,972 | 6/1963 | Johnston | 73/517 |
| 3,453,893 | 7/9169 | Ponterio | 137/81.5X |
| 3,472,257 | 10/1969 | Daruk et al. | 137/81.5 |
| 3,501,946 | 3/1970 | Riordan et al. | 73/515 |

*Primary Examiner*—William R. Cline
*Attorney*—Edgar J. Brower, Arthur L. Branning and T. O. Watson, Jr.

ABSTRACT: One or more fluidic amplifiers controlled by the motions of a uniaxial accelerometer. The accelerometer is in the form of a mass rigidly suspended from a horizontally supported strand, the mass moving under slight forces to restrict openings in a pressure line. The fluctuations in the line are used to control one or more fluidic amplifiers.

Patented Dec. 1, 1970

3,543,782

INVENTOR
PETER BAUER

BY Thomas O. Watson Jr.

ATTORNEY 3,543,782

UNIAXIAL ACCELEROMETER CONTROLLED FLUIDIC AMPLIFIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to controlled fluidic amplifiers and, more particularly, to a means of controlling them which is affected by velocity changes, as a uniaxial accelerometer and particularly one that is sensitive to small changes in velocity.

2. Description of the Prior Art

Fluidic amplifiers as such, forming part of this invention are not new and the invention does not relate to the amplifiers per se, examples of which may be found in U.S. Pat. Nos. 3,001,698 and 3,016,066. Pendulum type accelerometers are old in the art and are mostly used in connection with electric circuits to control shut-off mechanisms or governors.

SUMMARY OF THE INVENTION

This invention combines the use of an extremely sensitive accelerometer with fluidic amplifiers, either singly or in multiples, to provide a control for mechanism where it is unsafe or inconvenient to use electrical combinations, such as control of torpedoes both as to speed and direction.

The object of the present invention is the provision of a control unit which is sensitive to slight changes in velocity and which can be used with fluidic amplifiers.

Other objects, advantages and novel features of the present invention will become apparent from the following detailed description of the invention when considered in conjunction with the accompanying drawings.

DESCRIPTION OF THE PREFERRED EMBODIMENTS

Figure 1:
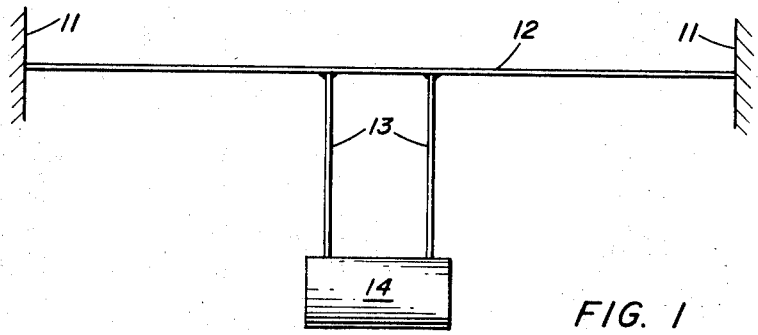
FIG. 1 is a front elevation of the uniaxial accelerometer.

Referring to FIG. 1, a pair of supports 11 retain a single strand of wire or a strand of quartz 12. Rigidly secured to the strand of quartz 12 by a pair of depending supporting rods 13 is a cylinder 14. It is secured so that any motion normal to the length of the strand of quartz or any motion which may be resolved into a component which is normal to the length of the quartz strand will effect a movement of the pendulumlike cylinder in a plane vertical to the length of the quartz strand and in a slight arc.

Figure 2:
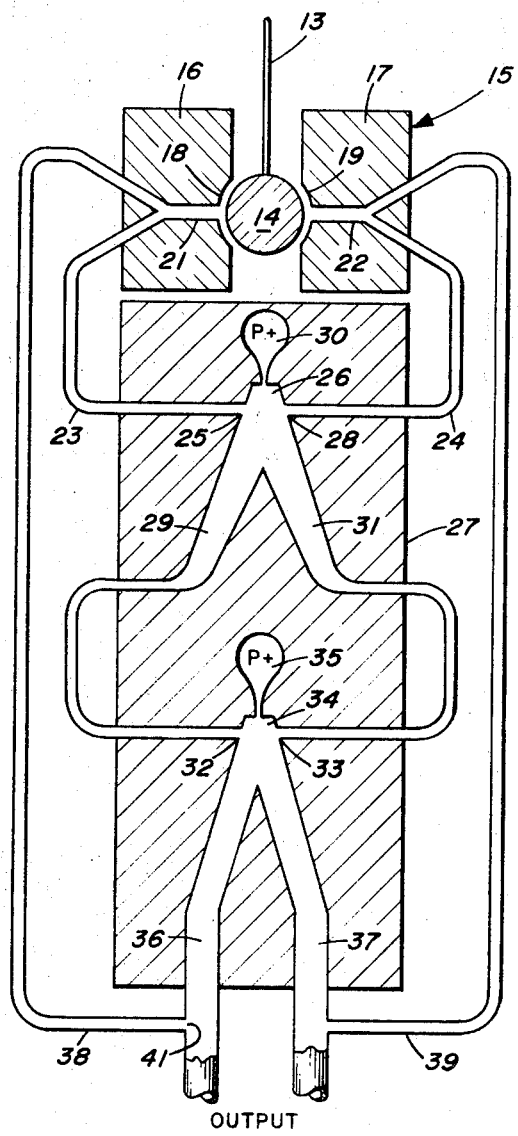
FIG. 2 shows the accelerometer and a two-stage fluidic amplifier.

Referring to FIG. 2, the accelerometer is shown coupled with a two-staged fluidic amplifier. A body 15 divided into sections 16 and 17 receives the cylindrical portion of the accelerometer. The sections 16 and 17 are recessed in arcs 18 and 19 which are of slightly larger diameter than the arc of the cylinder. Communicating with and terminating at the center of arc 18 is a conduit 21 while conduit 22 is similarly arranged with respect to arc 19. The conduits 21 and 22, respectively, lead out of the sections 16 and 17. Connected adjacent the terminations of conduits 21 and 22 are conduits 23 and 24, respectively. Conduit 23 leads to a termination 25 in recess 26 of block 27, while conduit 24 leads to termination 28 in the block 27 and opposite to the termination 25.

Block 27 houses the two-stage fluidic amplifier which has in its first stage an inlet or pressure source 30 leading into the recess 26 and further into one or both of the channels 29 and 31. These channels lead to terminations 32 and 33, respectively, located in the recess 34 in the second stage of the fluidic amplifier. A second pressure source 35 also enters the recess 34 and provides pressure for the second stage of the amplifier. This recess 34 is divided in a like manner to the recess 26 by channels 36 and 37 and which may be utilized as channels 29 and 31 to further amplify with a three-stage amplifier. However, these channels 36 and 37 are shown simply as discharging to controls, now shown, for operating any desired mechanism. Tapped into channels 36 and 37 are conduits 38 and 39, respectively, which lead back to the original pressure lines 21 and 22 to provide pressure for the operation of the entire unit.

The operation of the accelerometer controlled amplifier is as follows.

At any specific instant, the amplifier may be used to control the speed and direction of a torpedo, the channels 36 and 37 leading to mechanism for controlling the speed and the direction either through spring-biased pistons moving under pressure to control the rudder and the throttle or some other appropriate mechanism. When the torpedo deviates from a straight line path, the mass 14 is moved slightly, such as a small fraction of an inch and this motion is opposed by a fluid pressure increase in the region between block 18 and 19 and the mass 14, due to the decrease in venting area of fluid entering via channels 21 or 22. This decrease in venting area produces an increase in back pressure in either of the conduits depending on the direction of movement of the mass 14 and this back pressure is transmitted to either of lines 23 or 24. If the movement of the mass was to the left, in the drawing, the back pressure is established in line 23 and transmitted to the termination 25 in the recess 26 which acting on the pressure line coming from the source 30 channels more fluid into the channel 31. The channel 31 delivers the fluid to the termination 33 in the recess 34 to control the flow of the fluid coming from the source 35 of increased pressure to result in an increase in highly pressurized fluid flow into channel 36. The conduit 38 now receives an increased pressure at the point 41 and transmits this pressure to the conduit 21 to act against the mass 14 as a restoring force.

Each increment of acceleration is thus transmitted to the mechanism controlling the speed and direction of the torpedo to maintain its intended path and speed. The torpedo is mentioned only for purpose of illustration as the accelerometer controlled amplifier has many applications.

Obviously many modification and variations of the present invention are possible in the light of the above teachings.

I claim:

1. A uniaxial accelerometer control for a fluidic amplifier comprising:
   a supply of pressurized fluid for each amplifying stage;
   a base structure formed with fluid passageways connected to said pressurized fluid source, said base structure also formed with a central recess receiving the termination of two of those passageways;
   means adapted to move under the influence of changes in velocity supported above said base structure and extending into said recess and in close proximity to the terminations of said two passageways, said terminations being arranged with respect to the movable means such that changes in velocity will move said means in relation to the terminations of said passageways to partially restrict one of the termination openings and to vary the pressure of the fluid in the passageway so restricted;
   means conveying said pressure changes to control passageways of said amplifier; and
   means for connecting the output of said amplifier with the base structure terminations to provide a restoring force for the velocity controlled means.

2. A uniaxial accelerometer control for a fluidic amplifier according to claim 1 and including a second stage of amplification wherein a second source of supply of pressurized fluid is subject to the control of the results of the first stage of amplification.

3. A uniaxial accelerometer control according to claim 1 wherein the means affected by changes in velocity comprises a rigidly horizontally supported strand of quartz, a mass rigidly suspended therefrom so as to limit the motion of the mass to a movement normal at every point to the strand of quartz.

4. A uniaxial accelerometer control according to claim 3 wherein the rigidly supported mass is in the form of a cylinder and the terminations of the passageways in the central recess are arc-shaped to conform to the curve of the cylinder.